(12) United States Patent
Chapman et al.

(10) Patent No.: US 11,070,786 B2
(45) Date of Patent: Jul. 20, 2021

(54) ILLUMINATION-BASED SYSTEM FOR DISTRIBUTING IMMERSIVE EXPERIENCE CONTENT IN A MULTI-USER ENVIRONMENT

(71) Applicant: Disney Enterprises, Inc., Burbank, CA (US)

(72) Inventors: Steven Chapman, Thousand Oaks, CA (US); Joseph Popp, Cerritos, CA (US); Alice Taylor, Burbank, CA (US); Joseph Hager, Valencia, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 12 days.

(21) Appl. No.: 16/402,106

(22) Filed: May 2, 2019

(65) Prior Publication Data

US 2020/0351486 A1    Nov. 5, 2020

(51) Int. Cl.

| H04N 13/194 | (2018.01) |
|---|---|
| H04N 13/167 | (2018.01) |
| G06T 19/00 | (2011.01) |
| G06F 3/01 | (2006.01) |
| H04N 13/368 | (2018.01) |

(Continued)

(52) U.S. Cl.
CPC .......... H04N 13/194 (2018.05); G06F 3/011 (2013.01); G06T 19/003 (2013.01); H04B 10/1143 (2013.01); H04N 13/167 (2018.05); H04N 13/368 (2018.05); H04N 13/398 (2018.05); *G06T 2219/024* (2013.01)

(58) Field of Classification Search
CPC .. H04N 13/194; H04N 13/167; H04N 13/368; H04N 13/398

USPC ...................... 348/164, 169, 208.14, 51, 53
See application file for complete search history.

(56) References Cited

U.S. PATENT DOCUMENTS 6,597,807 B1 * 7/2003 Watkins .................... G06T 5/50
                                                                  382/164
8,576,276 B2   11/2013 Bar-Zeev et al.
(Continued)

FOREIGN PATENT DOCUMENTS

CN            102577401            7/2012

OTHER PUBLICATIONS

Thuillier, Jules, "Get Started with VR Tracked," VRtracker, https://vrtracker.xyz/developers/, 2016.

(Continued)

*Primary Examiner* — Paulos M Natnael
(74) *Attorney, Agent, or Firm* — Dorsey & Whitney LLP

(57) ABSTRACT

An immersive experience system is provided. The immersive experience system has a processor that determines a position of a first head-mounted display. Further, the processor determines a position of a second head-mounted display. The processor also generates a first image for a first immersive experience corresponding to the position of the first head-mounted display. Moreover, the process encodes the first image into a first infrared spectrum illumination having a first wavelength. In addition, the processor generates a second image for a second immersive experience corresponding to the position of the second head-mounted display. Finally, the processor encodes the second image into a second infrared spectrum illumination having a second wavelength. The first wavelength is distinct from the second wavelength.

19 Claims, 15 Drawing Sheets

(51) Int. Cl.
  *H04N 13/398*  (2018.01)
  *H04B 10/114*  (2013.01)

(56) References Cited

U.S. PATENT DOCUMENTS

| | | | |
|---|---|---|---|
| 9,532,039 B2 | 12/2016 | Levine | |
| 2013/0194305 A1 | 8/2013 | Kakuta et al. | |
| 2014/0176591 A1 | 6/2014 | Klein et al. | |
| 2016/0274362 A1 | 9/2016 | Tinch | |
| 2017/0105052 A1 | 4/2017 | DeFaria et al. | |
| 2017/0180800 A1 | 6/2017 | Mayrand | |
| 2017/0307888 A1* | 10/2017 | Kohler | G02B 27/0093 |
| 2017/0358140 A1 | 12/2017 | Kohler et al. | |
| 2018/0027349 A1 | 1/2018 | Osman | |
| 2018/0143313 A1 | 5/2018 | Wetzler et al. | |
| 2018/0376082 A1 | 12/2018 | Liu | |
| 2019/0018245 A1 | 1/2019 | Cheng et al. | |
| 2019/0043203 A1 | 2/2019 | Fleishman et al. | |

OTHER PUBLICATIONS

Fatahalian, Kayvon, et al., "Intro to Virtual Reality," https://cs184.eecs.berkeley.edu/uploads/lectures/37_vr-2/37_vr-2_slides.pdf.

Kubas-Meyer, Alec, "How Virtual and Augmented Reality Will (Probably) Change Gaming," https://www.phphotovideo.com/explora/computers/buying-guide/how-virtual-and-augmented-reality-will-probably-change-gaming, Mar. 11, 2019.

Aksit, Kaan, et al., "Near-Eye Varifocal Augmented Reality Display Using See-Through Screens," ACM Transactions on Graphics, vol. 36, No. 6, article 1, https://research.nvidia.com/sites/default/files/pubs/2017-11_Near-Eye-Varifocal-Augmented//AksitEtAl_SiggraphAsia2017_Near%20eye%20varifocal%20augmented%20reality%20display%20using%20see-through%20screens.pdf, Nov. 2017.

* cited by examiner

ILLUMINATION-BASED SYSTEM FOR DISTRIBUTING IMMERSIVE EXPERIENCE CONTENT IN A MULTI-USER ENVIRONMENT

BACKGROUND

1. Field

This disclosure generally relates to the field of audio/visual ("A/V") equipment. More particularly, the disclosure relates to an A/V system that provides an immersive experience.

2. General Background

Virtual reality ("VR") and augmented reality ("AR") are the two most common immersive experience technologies. Whereas a VR apparatus typically provides an immersive experience that is completely virtual, an AR apparatus typically provides a virtual experience in conjunction with a real-world experience (e.g., an overlay of various text and/or images over a real-world object, person, place, etc.).

Typically, a head-mounted display ("HMD"), such as headgear, glasses, etc., is worn by the user over his or her eyes to provide a VR or an AR experience. Yet, wearing the HMD can be quite uncomfortable for a user. For instance, the HMD can be quite heavy as a result of onboard sensor-fusion componentry that track the head position of a user, and processors built-in to the HMD to adjust the content displayed by the HMD based on the corresponding head position. Even when the processing componentry is positioned within a stand-alone computer rather than the HMD, the user will typically be tethered to the stand-alone computer via a backpack or one or more cables, thereby providing an added layer of inconvenience to the user. Therefore, conventional HMDs may not be optimal for immersive experience environments.

SUMMARY

In one aspect, an immersive experience system is provided. The immersive experience system has a processor that determines a position of a first HMD. Further, the processor determines a position of a second HMD. The processor also generates a first image for a first immersive experience corresponding to the position of the first HMD. Moreover, the process encodes the first image into a first infrared spectrum illumination having a first wavelength. In addition, the processor generates a second image for a second immersive experience corresponding to the position of the second HMD. Finally, the processor encodes the second image into a second infrared spectrum illumination having a second wavelength. The first wavelength is distinct from the second wavelength.

The immersive experience system also has a first optical emission device that emits the first infrared spectrum illumination for reception by the first HMD so that the first HMD projects the first image onto one or more display portions of the first HMD. Further, the immersive experience system has a second optical emission device that emits the second infrared spectrum illumination for reception by the second HMD so that the second HMD projects the second image onto one or more display portions of the second HMD.

In another aspect, a process is provided to perform the functionality of the immersive experience system.

In yet another aspect, an HMD is provided. The HMD has a frame. Further, the HMD has a display area and a photodetector that are operably attached to the frame. Additionally, the HMD has an optical bandpass filter that filters a plurality of infrared spectrum illuminations from a plurality of optical emission devices according to a predetermined wavelength such that a filtered infrared spectrum illumination is absorbed by the photodetector. Finally, the HMD has a projector operably attached to the frame. The projector projects an image, which is stored in the filtered infrared spectrum illumination, onto the display area.

In another aspect, a process is provided to perform the functionality of the HMD.

BRIEF DESCRIPTION OF THE DRAWINGS

The above-mentioned features of the present disclosure will become more apparent with reference to the following description taken in conjunction with the accompanying drawings, wherein like reference numerals denote like elements and in which.

DETAILED DESCRIPTION

An illumination-based system is provided to distribute immersive experience (e.g., AR, VR, etc.) content via a plurality of light rays to a plurality of HMDs in a multi-user environment. In contrast with bulky HMDs with heavy built-in electronics and/or cables tethered to an external computing device, the illumination-based system utilizes HMDs that have less onboard componentry, thereby resulting in a lighter and more convenient fit for users. In particular, the illumination-based system identifies users in the multi-user environment, and tracks their corresponding head movements to determine what content should be emitted in the form of the plurality of light rays. As a result, the plurality of HMDs may have minimal, or no, processing componentry, which allows for increased comfort for the plurality of users. Further, the HMDs in the illumination-based system are physically less restrictive than that of previous configurations, which often had to be tethered via a cable to an external computing device. As a result, the illumination-based system may be practically implemented in a variety of multi-user environments (e.g., theme parks), for which previous systems were not conducive to providing immersive experiences. Moreover, the illumination-based system allows for HMDs to provide a plurality of immersive experiences, each tailored to a specific user, such that different users may have different immersive experiences within the same physical boundaries of a given real-world environment.

Figure 1:
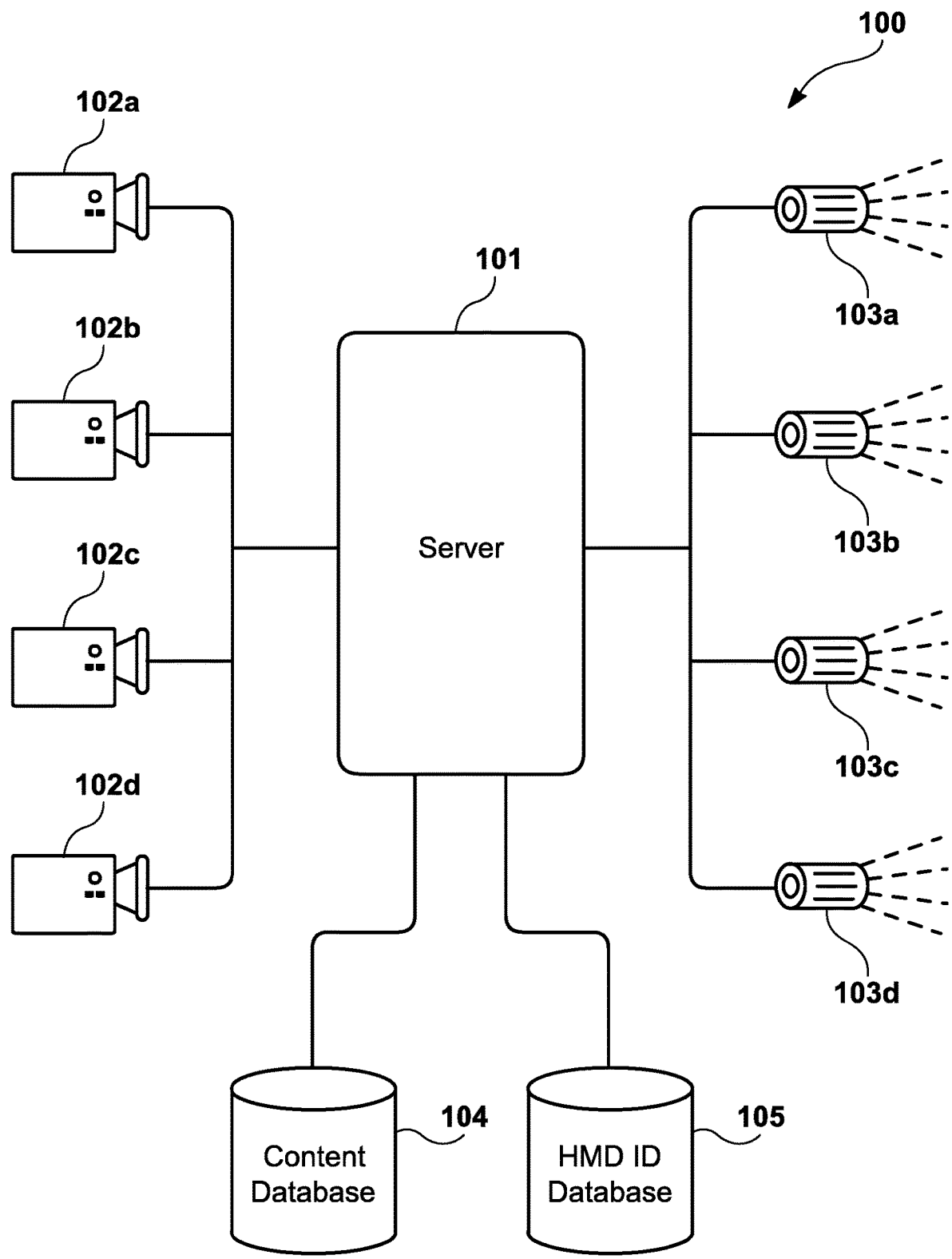
FIG. 1 illustrates an illumination-based system that tracks user head movement and distributes immersive experience content based on the detected head movement.

FIG. 1 illustrates an illumination-based system 100 that tracks user head movement and distributes immersive experience content based on the detected head movement. The illumination-based system 100 has a plurality of image capture devices 102a-d (e.g., cameras) that are capable of capturing images of light emitted from an HMD worn by a user. For example, the image capture devices 102a-d may be solid state imaging devices, each having a solid state imaging sensor capable of imaging at least a portion of the infrared ("IR") spectrum. As a result, the plurality of image capture devices 102a-d may capture imagery corresponding to the head position of a user via IR light emitted from an HMD worn by the user without such IR light being visible to the unaided eye. Alternatively, the plurality of image capture devices 102a-d may detect the head position of the user via visible spectrum illumination emitted from the HMD. Although the illumination-based system 100 is illustrated as using the image capture devices 102a-d, one or more sensors may be used instead of the image capture devices 102a-d to sense optical emission of one or more light rays from an HMD worn by a user.

Further, the illumination-based system 100 has a server 101 (e.g., computing device), which receives the imagery captured by the plurality of image capture devices 102a-d. By performing image analysis on the imagery captured by one or more of the plurality of image capture devices 102a-d, the server 101 is able to determine the head position (e.g., viewpoint, head tilt, etc.) of the user. Accordingly, the server 101 is able to detect and track the viewpoint of a user even if the user moves (e.g., walks, positioned within a moving vehicle, etc.) throughout an immersive experience environment (e.g., a theme park attraction).

Moreover, multiple viewpoints of different users may be simultaneously detected and tracked by the server 101. Each of the HMDs worn by different users may emit IR light in a distinct manner so that the 101 server is able to differentiate different HMDs during detection and tracking through the image analysis. In one embodiment, the HMDs emit IR in distinct patterns (e.g., different emission rates). For example, one HMD may emit two flashes of blue followed by two flashes of green according to a particular time sequence, whereas another HMD may emit two flashes of blue followed by four flashes of red in a different time sequence. As another example, the HMDs may be calibrated based on a clock of the server 101, and may each emit a pattern that uniquely deviates from the time signal generated by the clock. In another embodiment, the HMDs emit IR according to distinct wavelengths, each of which identifies a particular optical device. In some configurations, the HMD may emit light rays in a manner that uniquely identifies the HMD without a controller; in other configurations, the HMD may use a controller.

Notwithstanding the manner in which the server 101 receives data from an HMD, the server 101 may be in operable communication with an HMD identifier database 105, which stores a predetermined wavelength for a registered HMD. The server 101 is then able to distribute content, and/or a viewpoint, specific to a particular HMD that is detected. In one embodiment, the content is customized for a particular HMD. For example, one user may experience an AR video game while another user may experience an AR tour. In another embodiment, the content is the same for the users in the multi-user environment but is distributed to different users based on the differing viewpoints of those users in the multi-user environment. For example, one user may view an AR video game from one side of a room whereas another user may view the AR video game from another side of the room.

Further, the server 101 may be in communication with a content database 104 from which the server 101 may retrieve content for distribution to the various users in the multi-user environment. The server 101 may then encode the content into an invisible spectrum illumination (e.g., an IR stream). Different content, or different viewpoints of the same content, may be encoded at different wavelengths. For example, wavelengths in the range of seven hundred eighty nanometers to one thousand two hundred nanometers are outside the visible spectrum. Accordingly, first content may distributed at a wavelength of eight hundred nanometers whereas second content may be distributed at a wavelength of nine hundred nanometers. The server 101 may emit, via the one or more optical emission devices 103a-d, an IR stream with wavelengths of the content corresponding to detected and tracked users' viewpoints. In one embodiment, the server 101 may emit the IR stream without filtering the IR stream for a particular user—the server 101 relies on the HMDs to perform the filtering. In another embodiment, the server 101 filters the optical emissions based on detected and tracked users' HMDs.

By having the server 101 detect the head movement of the user, track the head movement, and generate imagery for a particular head movement, the illumination-based system 100 reduces the amount of processing componentry positioned within the HMDs (e.g., AR-based HMD 400 illustrated in FIG. 4A and VR-based HMD 420 illustrated in FIG. 4B) to little or none. As a result, the HMDs may provide a high quality immersive experience, but with more practicality than previous configurations to allow for use in multi-user environments, such as theme parks and other location-based entertainment.

Figure 2:
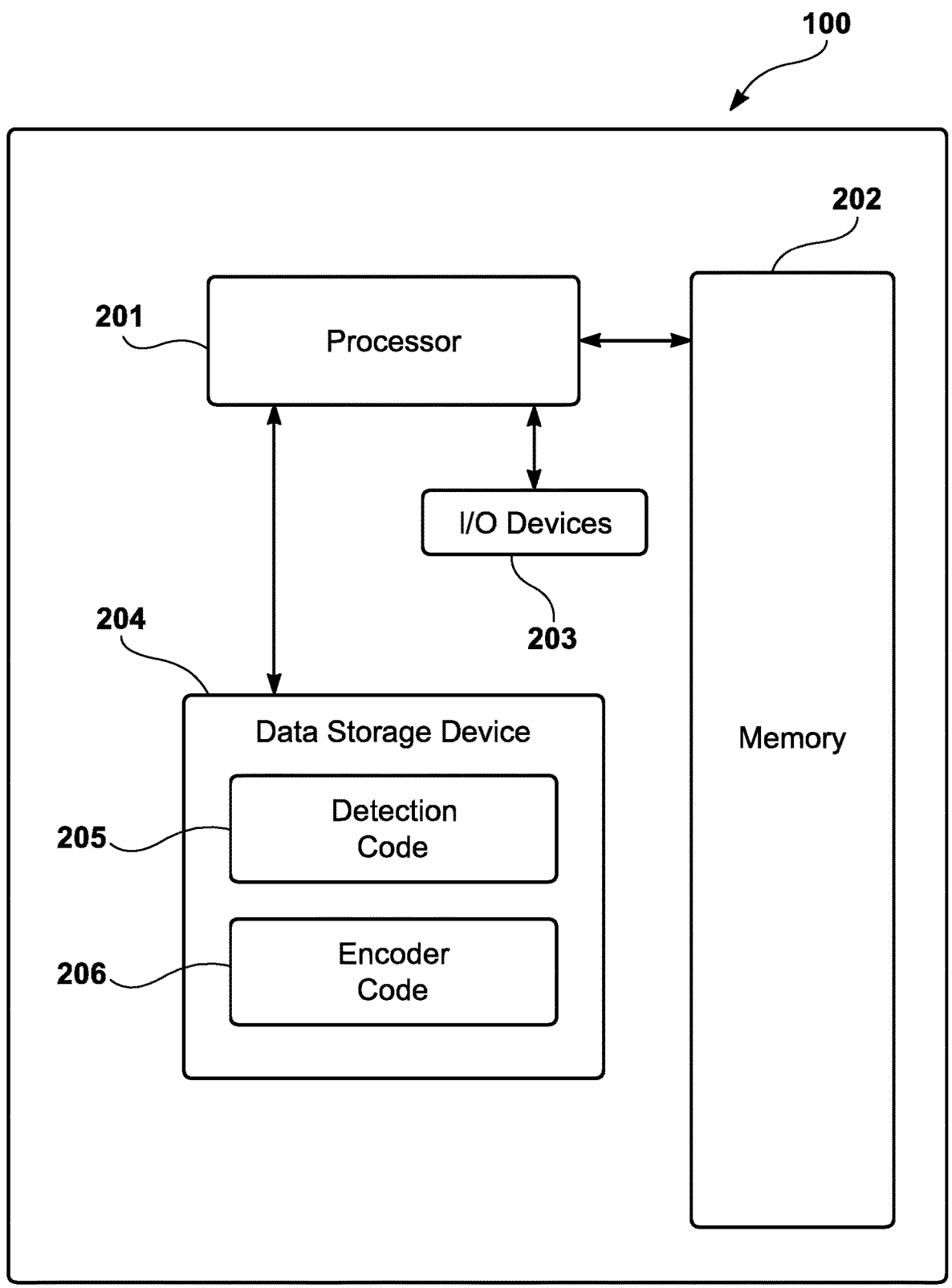
FIG. 2 illustrates the internal components of the server illustrated in FIG. 1.

FIG. 2 illustrates the internal components of the server 101 illustrated in FIG. 1. The server 101 includes a processor 201, which may be specialized for performing image analysis and/or image generation for multi-user immersive experiences, such as AR/VR. In other words, the processor 201, alone or in conjunction with additional processors, has the computational capability to detect head movement and generate immersive experience imagery in real-time with respect to the time at which the head movement is detected;

as a result, a user is able to instantaneously view imagery associated with his or her head movement with little, or no, processing componentry within his or her HMD.

Further, the server 101 has a memory device 202, which may temporarily store computer readable instructions performed by the processor 201. The server 101 also has one or more input/output ("I/O") devices 203 (e.g., keyboard, mouse, pointing device, touch screen, microphone, receiver, transmitter, transceiver, etc.). Finally, the server 101 has a data storage device 204, which stores detection code 205 and encoder code 206. The processor 201 may execute the detection code 205 to detect the head movement of the plurality of users in the multi-user environment. Further, the processor 201 may execute the encoder code 206 to encode an IR stream, or other type of invisible spectrum illumination, with imagery selected from the content database 104, illustrated in FIG. 1, or with imagery generated by the processor 201 on-the-fly.

Figure 3:
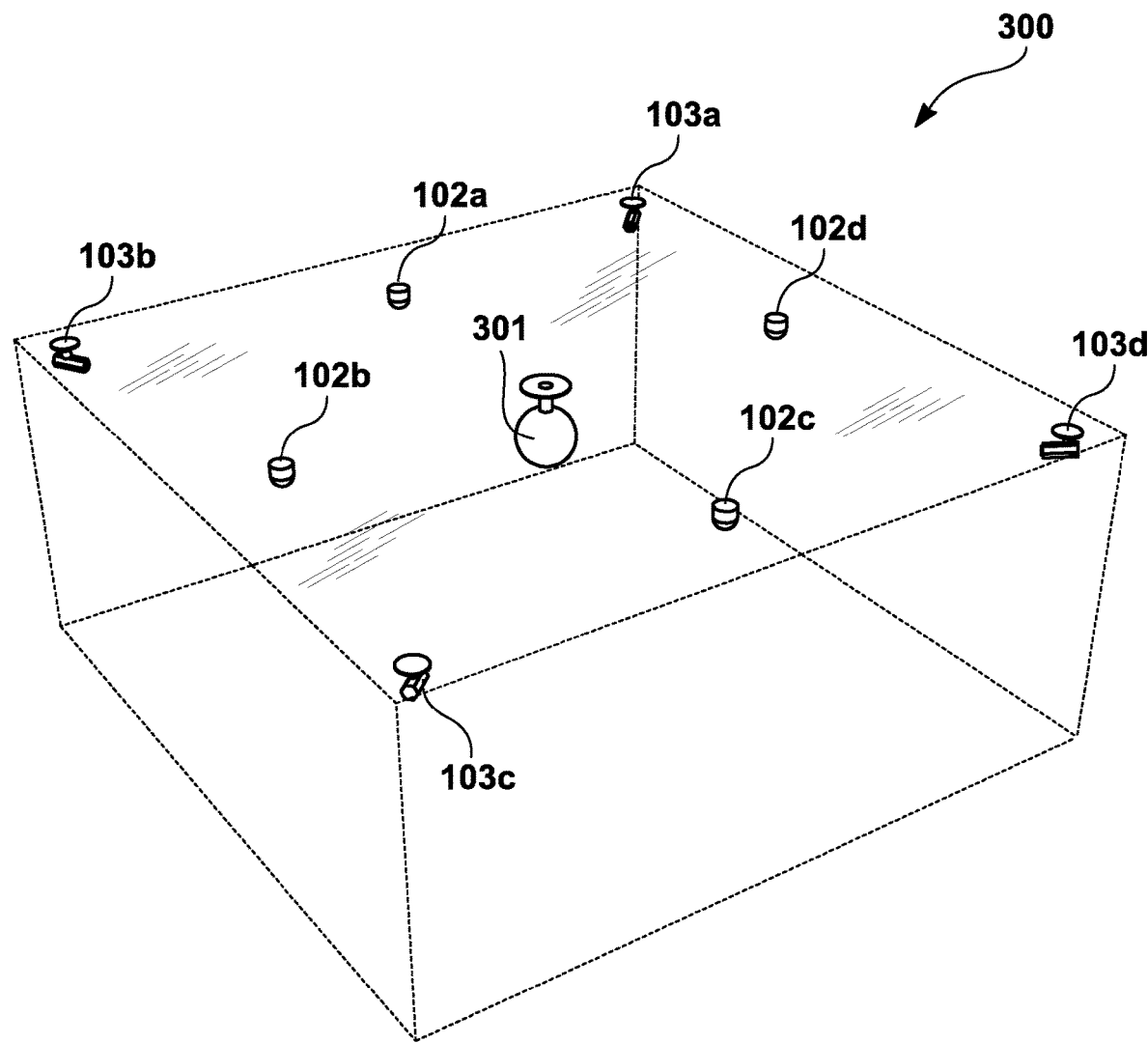
FIG. 3 illustrates an example of a multi-user environment in which the illumination-based system illustrated in FIG. 1 may generate a plurality of immersive experiences.

FIG. 3 illustrates an example of a multi-user environment 300 in which the illumination-based system 100 illustrated in FIG. 1 may generate a plurality of immersive experiences. The multi-user environment 300 may have certain physical boundaries (e.g., ceiling, floor, walls, etc.) in which the plurality of immersive experiences are provided. Further, one or more of the components of the illumination-based system 100 may be positioned internally within, or externally to, the multi-user environment 300. For example, the multi-user environment 300 may have the plurality of image capture devices 102*a-d* operably attached to a ceiling to capture overhead images of the HMDs for tracking and detection by the server 101. In other words, the plurality of image capture devices 102*a-d* may be vertically positioned, or substantially vertically positioned (e.g., within a zero to twenty degree differential from vertical positioning), to capture overhead images of the HMDs. As another example, the plurality of optical emission devices 103*a-d* may be positioned such that they emit light rays (e.g., IR streams) toward a reflective object 301 that reflects the light rays in a dispersed manner toward multiple users in the multi-user environment. In other words, one of the optical emission devices 103*a-d* may emit a finely calibrated laser beam directly towards a specific HMD in a single-user environment, but the laser beam may be diffused from the reflective object 301 (e.g., a geometrically-shaped object with a diffusion material surrounding at least a portion thereof) that delivers the laser beam to multiple users in the multi-user environment 300.

The server 101 may be located locally within the multi-user environment 300, or in close proximity to the multi-user environment 300. Accordingly, the server 101 may be connected to the various componentry within the multi-user environment 300 via a wired, or wireless, connection. Alternatively, the server 101 may be located remotely from the multi-user environment 300 (e.g., as a cloud server). For example, a transceiver positioned within, or in proximity to, the multi-user environment 300 may transmit IR signals detected by the plurality of image capture devices 102*a-d* to the server 101. Further, the transceiver may receive IR streams from the server 101 for emission by the optical emission devices 103*a-d*.

Figure 4A:
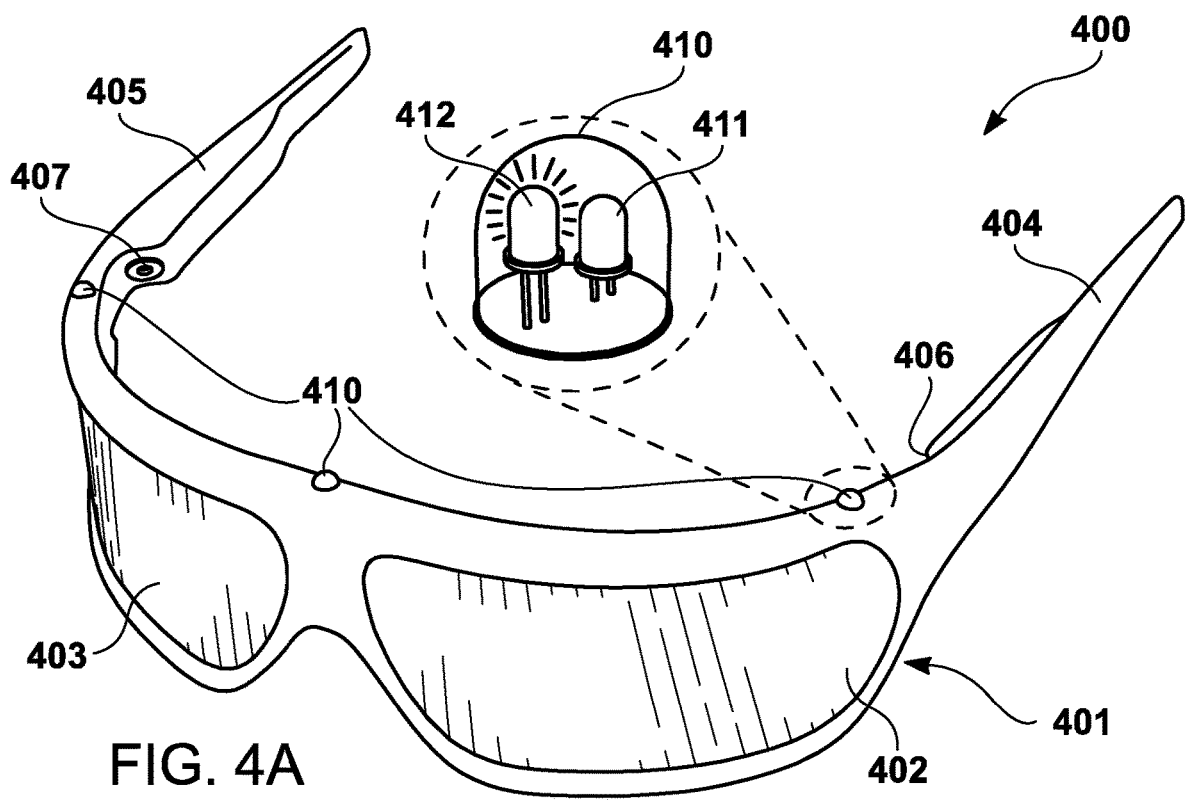
FIG. 4A illustrates an AR-based HMD.
Figure 4B:
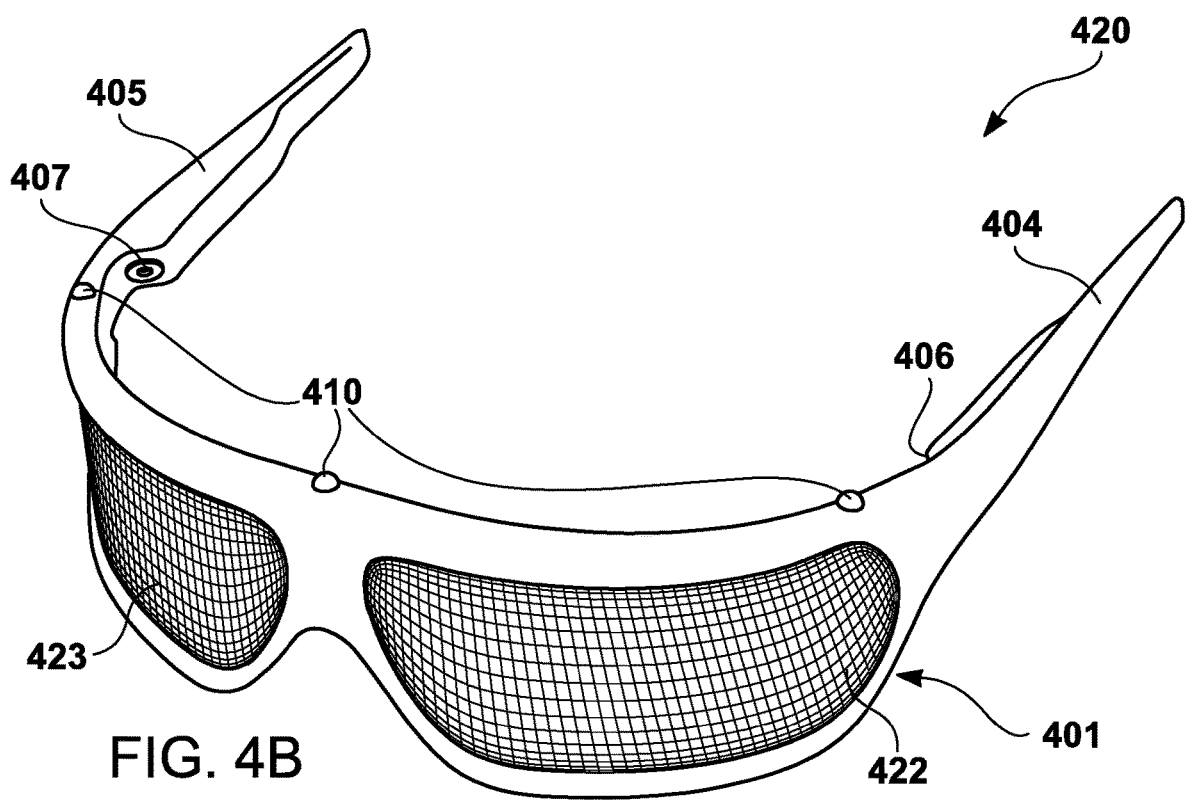
FIG. 4B illustrates a VR-based HMD.

Further, FIGS. 4A and 4B illustrate examples of HMDs that may be worn by users in the multi-user environment 300 illustrated in FIG. 3. In particular, FIG. 4A illustrates an AR-based HMD 400. A left-eye lens 402 and a right-eye lens 403 are operably attached to a frame 401 of the AR-based HMD 400, and are clear to allow for an AR experience. Further, the frame 401 includes a left arm 404 and a right arm 405, which allow a user to place the AR-based HMD 400 over his or her ears in a manner similar to a pair of glasses. (Although the arms 404 and 405 provide a convenient fit for a user, other mechanisms (e.g., bands, straps, etc.) may be used to adhere the AR-based HMD 400, or any other HMD described herein, to the head of a user.) In one embodiment, the AR-based HMD 400 includes a left projector 406 integrated within the left arm 404 and a right projector 407 integrated within the right arm 405. In another embodiment, the left projector 406 and the right projector 407 may be integrated within other portions of the arms 404 and 405, or other parts of the frame 401. In yet another embodiment, the left projector 406 and the right projector 407 may be operably attached to, instead of being integrated within, the frame 401.

Further, an array of encasings 410 may be positioned along the top of the frame 401. In one embodiment, the encasings 410 each include a light emitting diode ("LED") 412 and a photodetector 411. The encasings 410 may be at least partially transparent so that the LEDs 412 may emit a coded pattern that uniquely identifies the AR-based HMD 400, or at least distinguishes the AR-based HMD 400 from other AR-based HMDs positioned within the multi-user environment 300 illustrated in FIG. 3, and that may be captured by one or more of the image capture devices 102*a-d* illustrated in FIG. 3. For example, the LEDs 412 positioned within the array of encasings 410 may emit an IR stream that encodes an identifier particular to the AR-based HMD 400. As a result, the image capture devices 102*a-d* may capture images of a user's head movement throughout the multi-user environment 300 for image analysis by the server 101 illustrated in FIGS. 1 and 2.

Additionally, the array of encasings 410 may each include a photodetector 411 (e.g., phototransistor), which absorbs the illumination emitted from the plurality of optical emission devices 103*a-d*, and converts that illumination into one or more electrical signals. The photodetector 411 may be coated with an optical bandpass filter that is wavelength-specific to the AR-based HMD 400. For example, three encasings 410 may have situated therein a different optical bandpass filter coating per color (e.g., one for red, one for green, and one for blue). In other words, the AR-based HMD 400 may receive and filter three different wavelengths that are specific enough to the AR-based HMD 400 to differentiate it from other HMDs in the multi-user environment 300. A wavelength may also, or alternatively, be used for features other than color, such as brightness, contrast, or hue. Further, other quantities of wavelengths (e.g., a single wavelength) may be received by one or more photodetectors 411 within one or more encasings 410.

Upon conversion of the received illumination to one or more electrical signals, the photodetector 411 may be in operable communication with a device that converts the one or more electrical signals to the digital imagery included within the illumination emitted by the one or more of the optical emission devices 103*a-d*. For example, a field programmable gate array ("FPGA") may be in operable communication with the photodetector 411, and may convert the one or more electrical signals into digital imagery. The FPGA may then provide the digital imagery to the left projector 406 and the right projector 407 for projection onto the left-eye lens 402 and the right-eye lens 403. The left projector 406 and the right projector 407 may be each configured to project their respective portions (e.g., left and rights parts of the imagery) onto the left-eye lens 402 and the right-eye lens 403, respectively.

In another embodiment, the LEDs 412 and the photodetectors 411 may be positioned within their own respective encasings 410. In other words, one encasing 410 may encase an LED 412 whereas a distinct encasing 410 may encase a photodetector 411. (Although three encasings 410 are illustrated in FIG. 4A, a different quantity of encasings 410, photodetectors 411, and LEDs 412 may be used instead.)

FIG. 4B illustrates a VR-based HMD 420. Instead of having clear left-eye and right-eye lenses 402 and 403, which are suitable for an AR environment, the VR-based HMD 420 has opaque left-eye and right-eye lenses 422 and 423, which are suitable for a VR environment. The other componentry of the VR-based HMD 420 may be similar to that of the AR-based HMD 400. Alternatively, the VR-based HMD 420 may have a display screen that is similar to that of a smartphone adhered to the head of a user.

Figure 5:
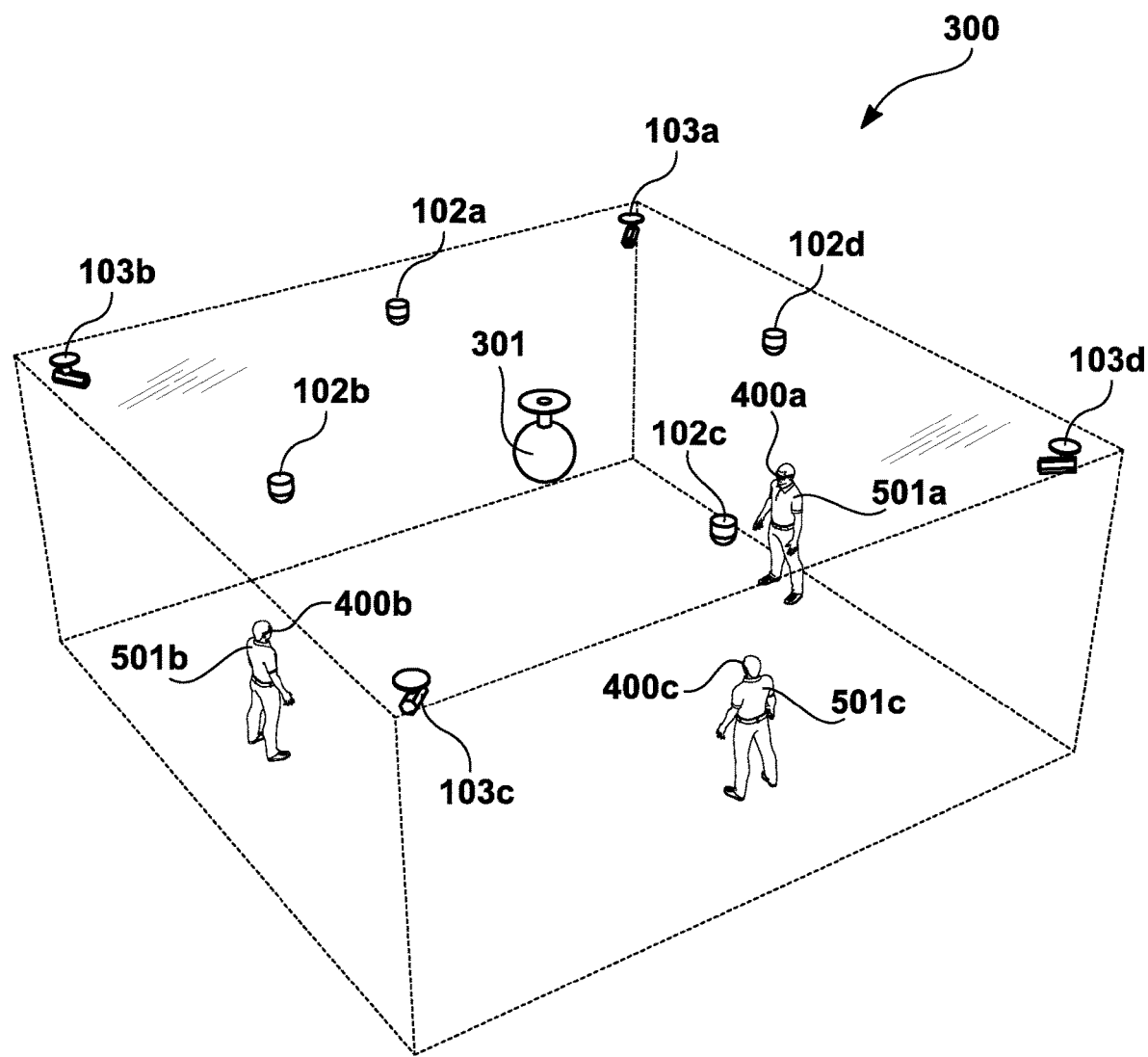
FIG. 5 illustrates an example of a plurality of users wearing the AR-based HMDs, illustrated in FIG. 4A, in the multi-user environment, illustrated in FIG. 3.

FIG. 5 illustrates an example of a plurality of users 501a-c wearing the AR-based HMDs 400a-c, illustrated in FIG. 4A, in the multi-user environment 300, illustrated in FIG. 3. Given that each of the AR-based HMDs 400a-c emits a uniquely encoded IR stream for identification purposes, the plurality of image capture devices 102a-d situated above the plurality of users 501a-c may capture images (e.g., on a frame-by-frame basis) of the users' 501a-c head movement. By capturing imagery overhead, the plurality of image capture devices 102a-d avoid occlusion that may occur with other types of positioning, and avoid interference that may occur via other forms of transmission, such as radio transmission. Nonetheless, the plurality of image capture devices 102a-d may capture imagery from positions other than directly overhead. Further, imagery may be captured from multiple vantage points to minimize the effects of possible occlusion. For example, two or more of the image capture devices 102a-d may capture images of the AR-based HMDs 400a-c to minimize occlusions (e.g., hand waving, special effects, etc.).

Figure 6A:
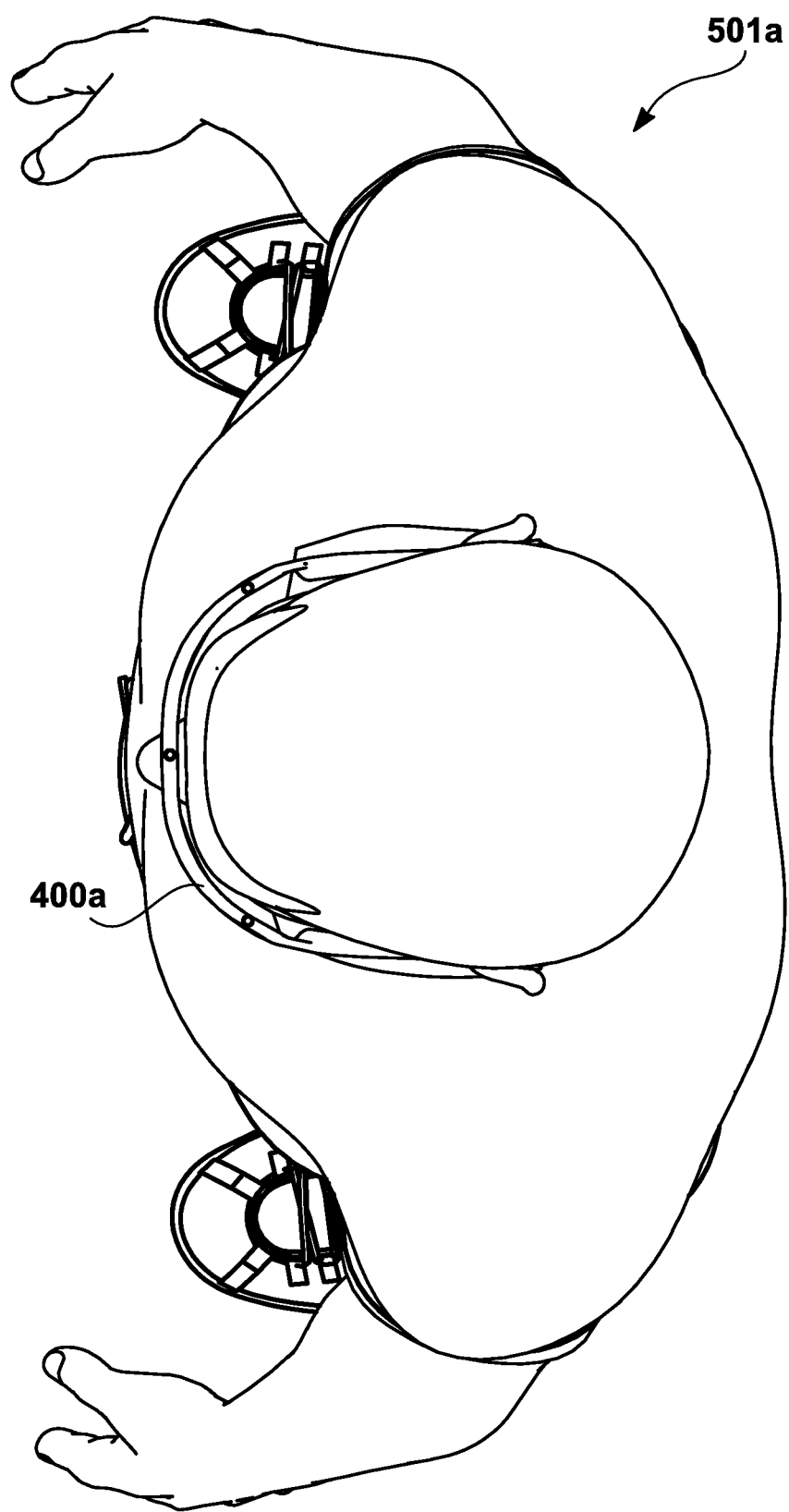
FIG. 6A illustrates a first image of the user, captured by one or more of the image capture devices, at a first position of the user within the multi-user environment.
Figure 6B:
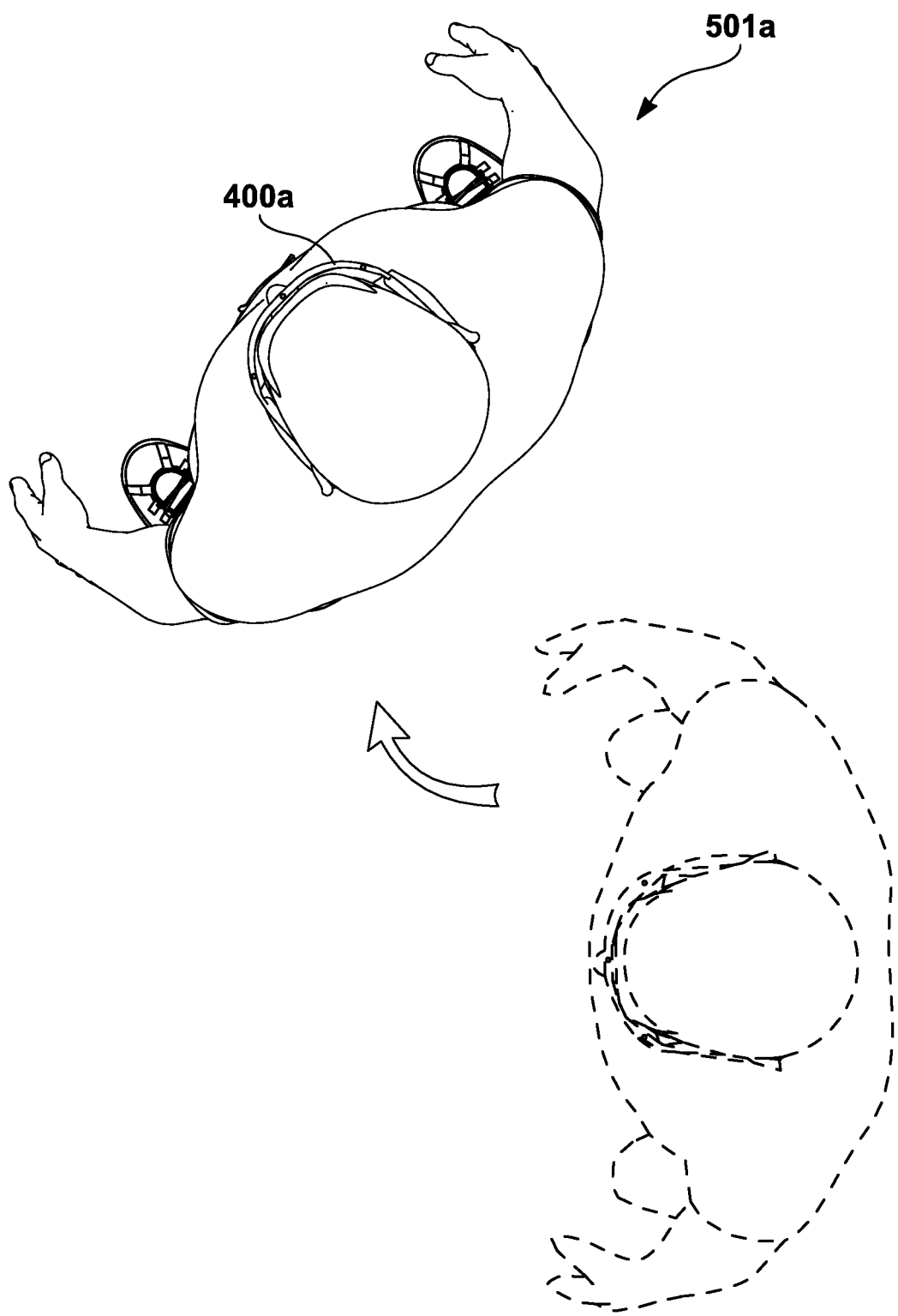
FIG. 6B illustrates a second image of the user, captured by one or more of the image capture devices, at a second position of the user within the multi-user environment.

FIGS. 6A and 6B illustrate an example of one or more of the image capture devices 102a-d capturing images of one of the plurality of users 501a-c in the multi-user environment 300 illustrated in FIG. 5. FIG. 6A illustrates a first image of the user 501a and corresponding HMD 400a captured by one or more of the image capture devices 102a-d at a first position of the user 501a within the multi-user environment 300. Further, FIG. 6B illustrates a second image of the user 501a and corresponding HMD 400a captured by one or more of the image capture devices 102a-d at a second position of the user 501a within the multi-user environment 300. In other words, the image capture devices 102a-d may capture images, on a frame-by-frame basis, of the AR-based HMD 400a so that the server 101, illustrated in FIGS. 1A and 1B, may track the user 501a wearing the HMD 400a via the uniquely encoded IR stream emitted by the LEDs 412 positioned within the encasings 410 illustrated in FIG. 5. For example, the positions of the LEDs 412 within the captured images may be detected and tracked by the server 101 to determine the position of the HMD 400a. Various head positions (e.g., head turns, head tilts, etc.) may be determined by analyzing the positions of the LEDs 412 in the captured images relative to one another.

Figure 7:
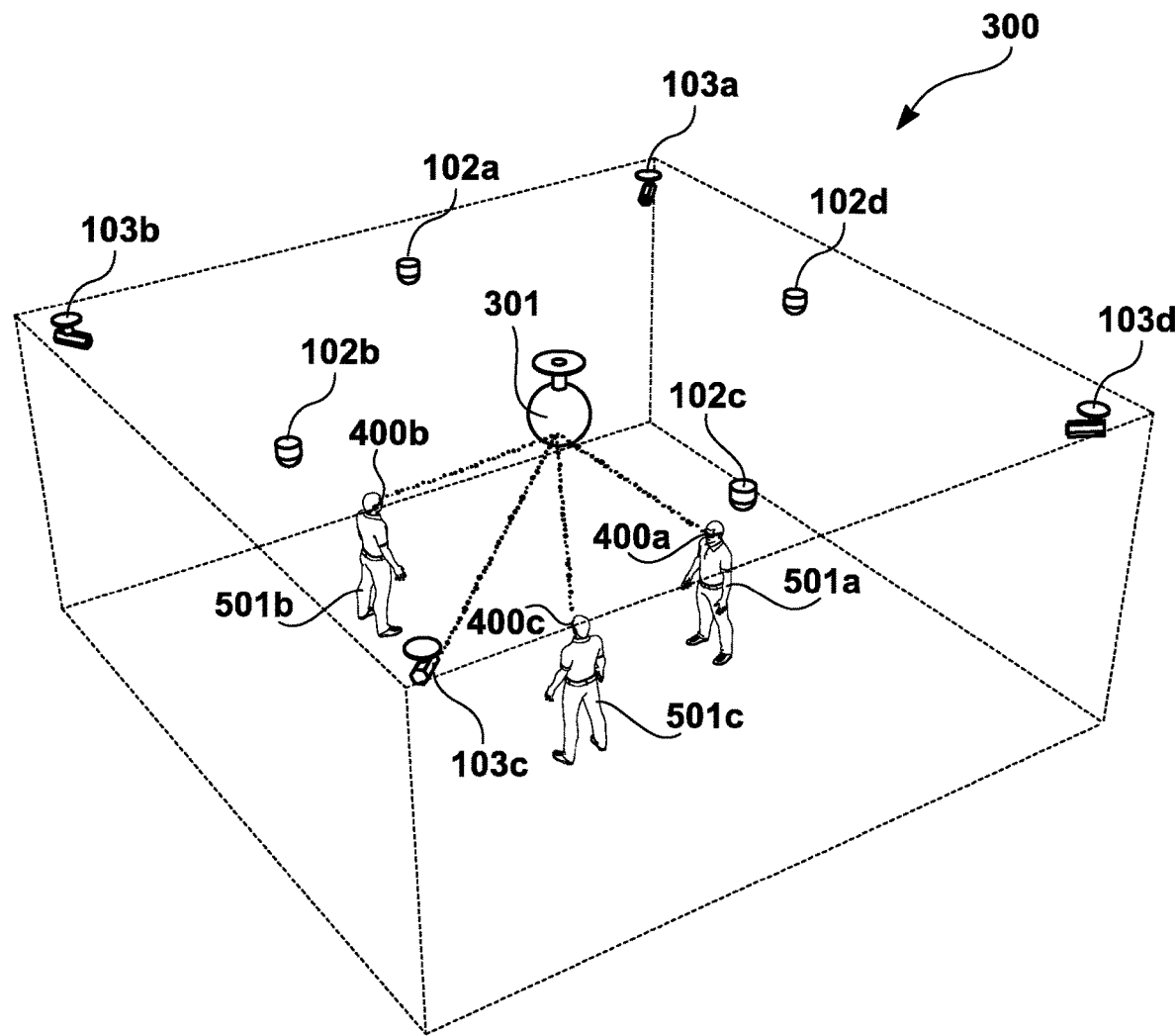
FIG. 7 illustrates an example of one of the optical emission devices emitting content in a wavelength specific to the detected and tracked AR-based HMD illustrated in FIGS. 6A and 6B.

Moreover, FIG. 7 illustrates an example of one of the optical emission devices 103a-d emitting content in a wavelength specific to the detected and tracked AR-based HMD 400a illustrated in FIGS. 6A and 6B. Upon determining the head movement of the user 501a, the server 101, illustrated in FIGS. 1A and 1B, generates imagery (e.g., a particular view of content that is common to a multi-user AR experience) based on that detected head movement. The imagery may be received by the other AR-based HMDs 400b and c, but will only be displayed by the HMD 400a because the optical bandpass filters of the HMDs 400b and c will filter out the imagery corresponding to the HMD 400a.

Figure 8A:
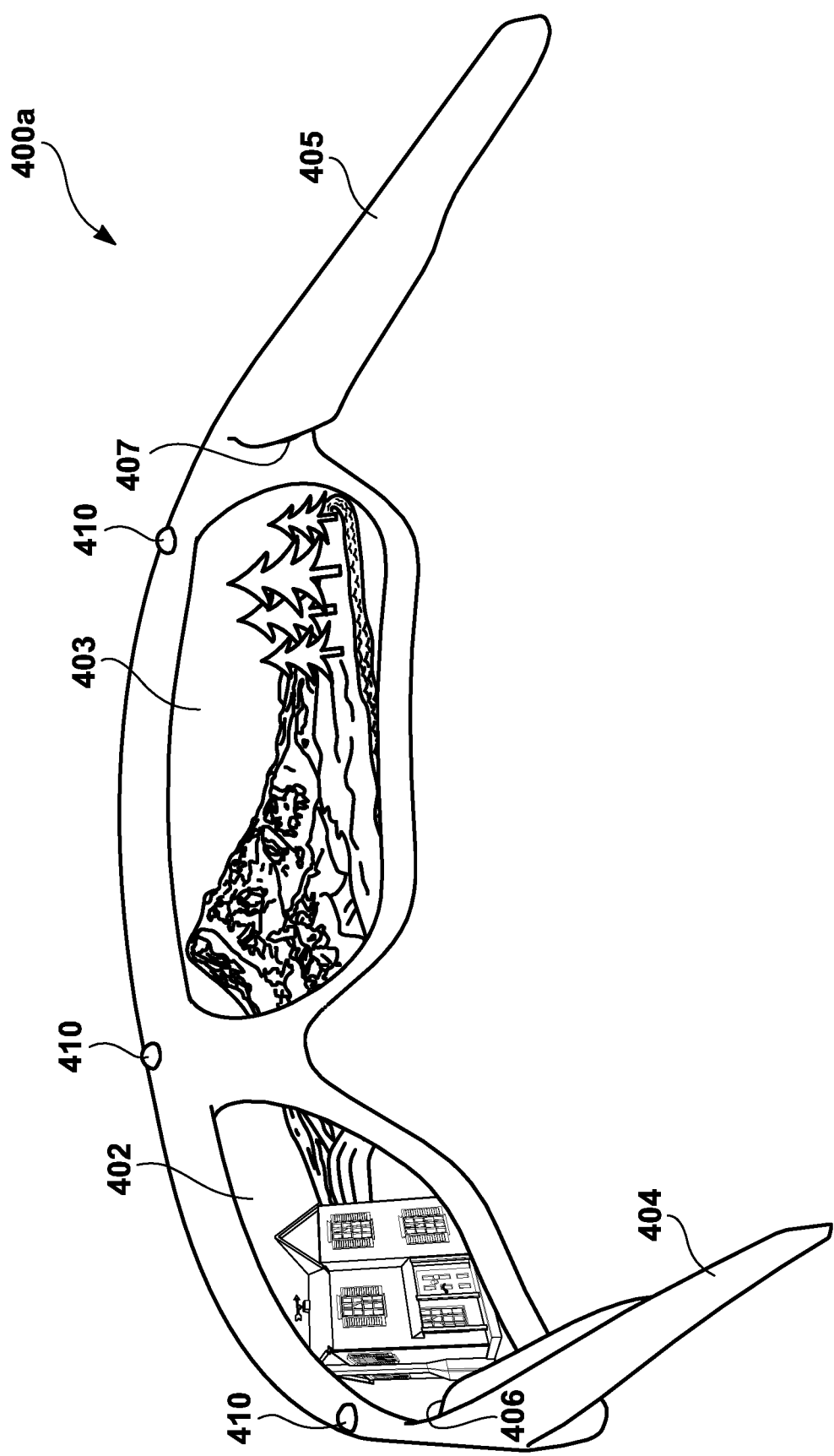
FIG. 8A illustrates the HMD, which may be worn by the first user, displaying imagery from a first vantage point within the multi-user environment, illustrated in FIG. 3.
Figure 8B:
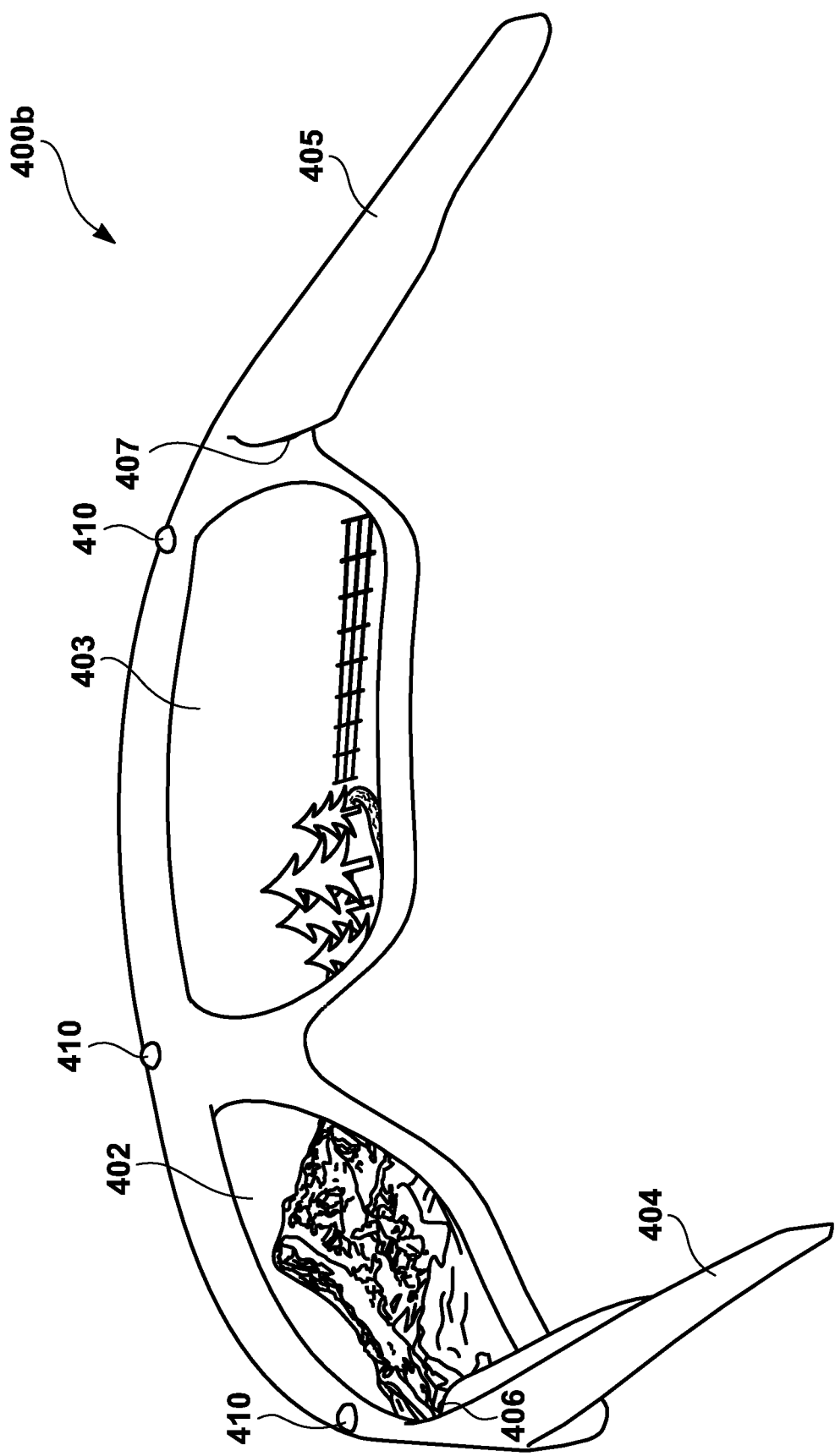
FIG. 8B illustrates the HMD, which may be worn by the second user, displaying imagery from a second vantage point within the multi-user environment.

Further, FIGS. 8A-8D illustrate internal views of the HMDs 400a-c as viewed by different users 501a-c in the multi-user environment. For example, FIG. 8A illustrates the HMD 400a, which may be worn by the first user 501a, displaying imagery from a first vantage point within the multi-user environment 300 illustrated in FIG. 3. Conversely, FIG. 8B illustrates the HMD 400b, which may be worn by the second user 501b, displaying imagery from a second vantage point within the multi-user environment 300. In other words, the HMDs 400a-c may display different imagery corresponding to the same AR/VR content, but differing based on the detected head movements of the users 501a-c.

Figure 8C:
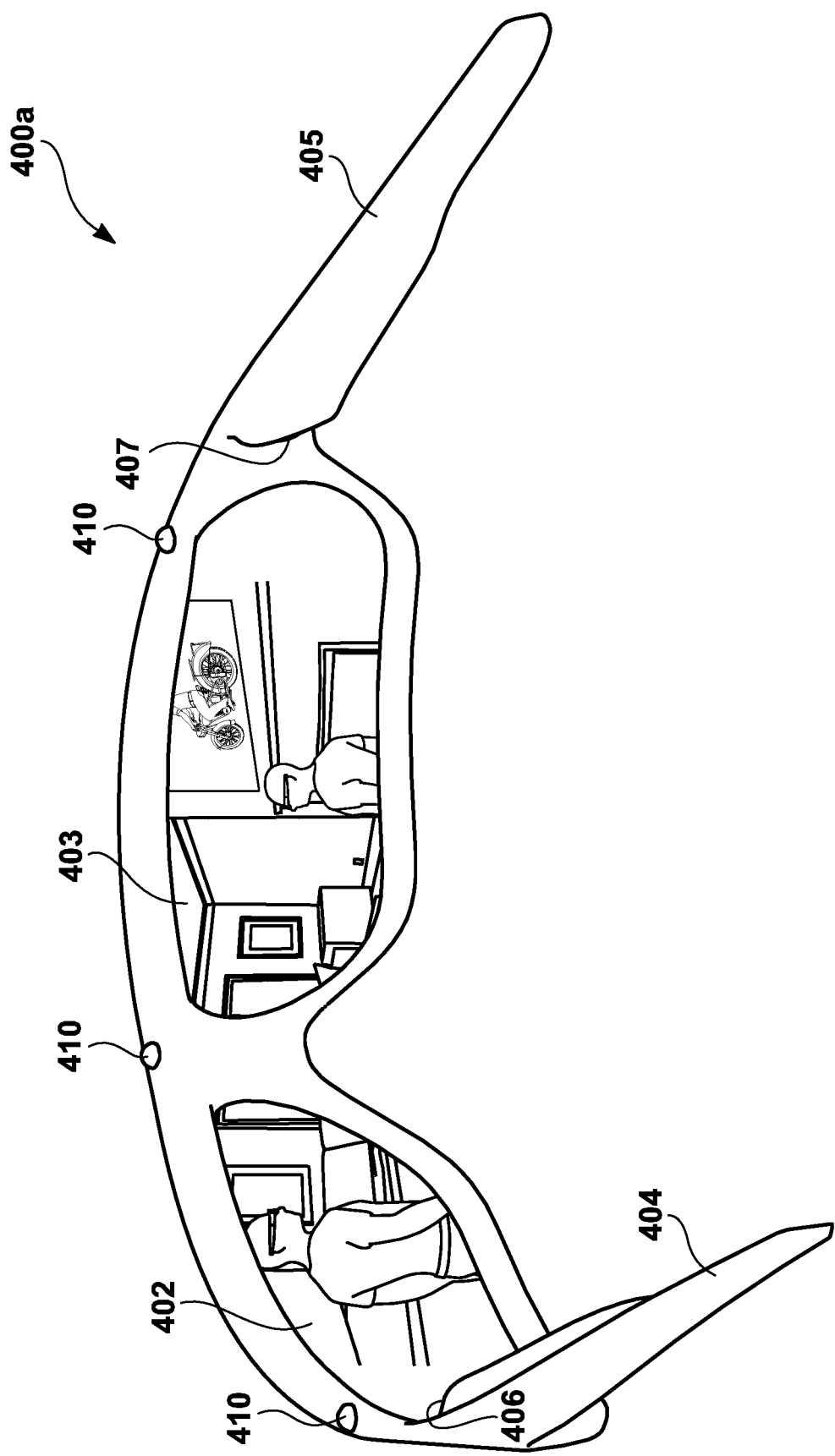
FIG. 8C illustrates the HMD, which may be worn by the first user, displaying imagery corresponding to an AR environment within a room.
Figure 8D:
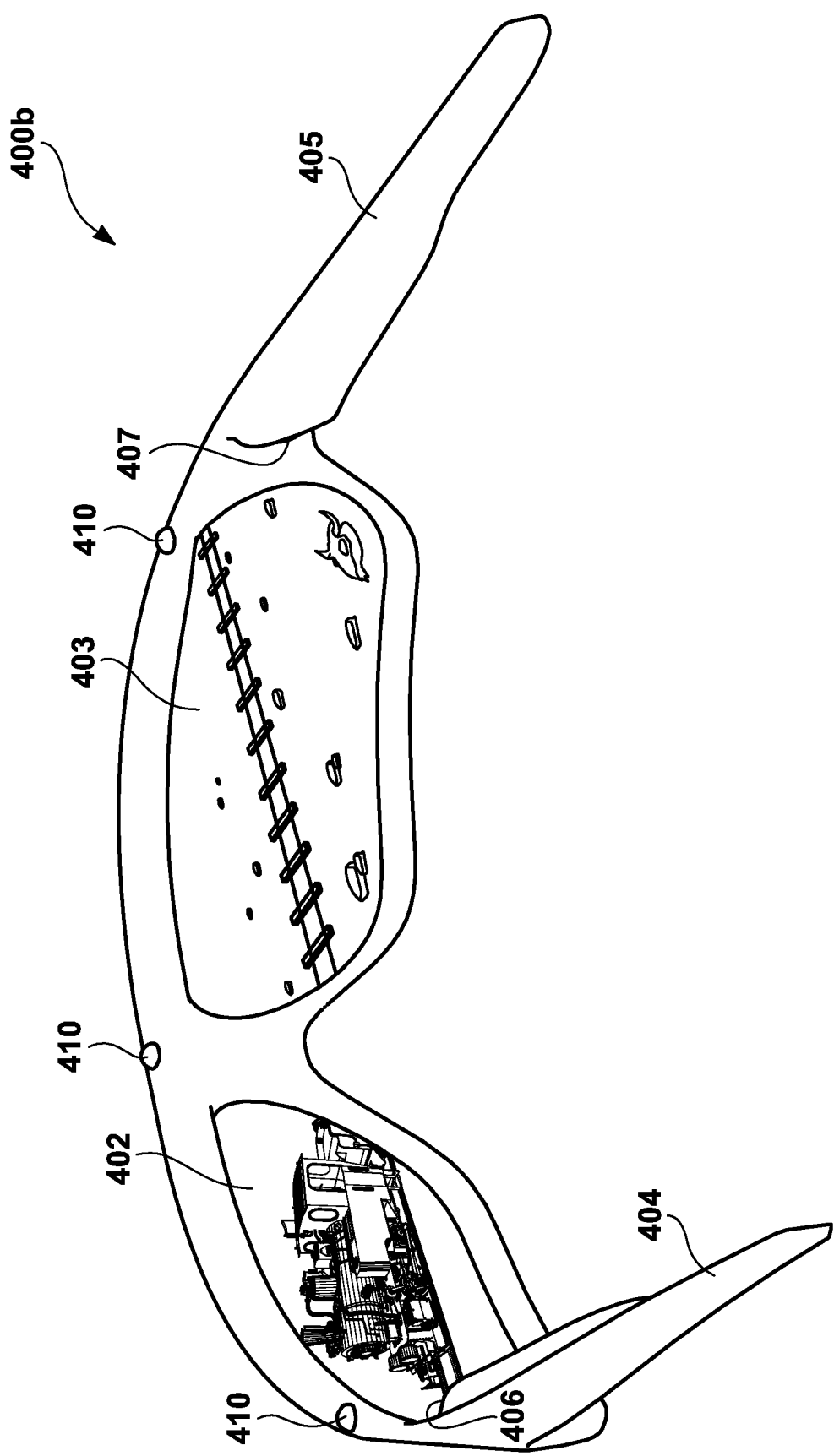
FIG. 8D illustrates the HMD, which may be worn by the second user, displaying imagery corresponding to VR content.

Alternatively, the HMDs 400a-c may be display different imagery corresponding to different AR/VR content that is displayed based on a particular one of the HMDs 400a-c worn by one of the users 501a-c. For example, FIG. 8C illustrates the HMD 400a, which may be worn by the first user 501a, displaying imagery corresponding to an AR environment within a room. By way of contrast, FIG. 8D illustrates the HMD 400b, which may be worn by the second user 501b, displaying imagery corresponding to VR content.

Figure 9:
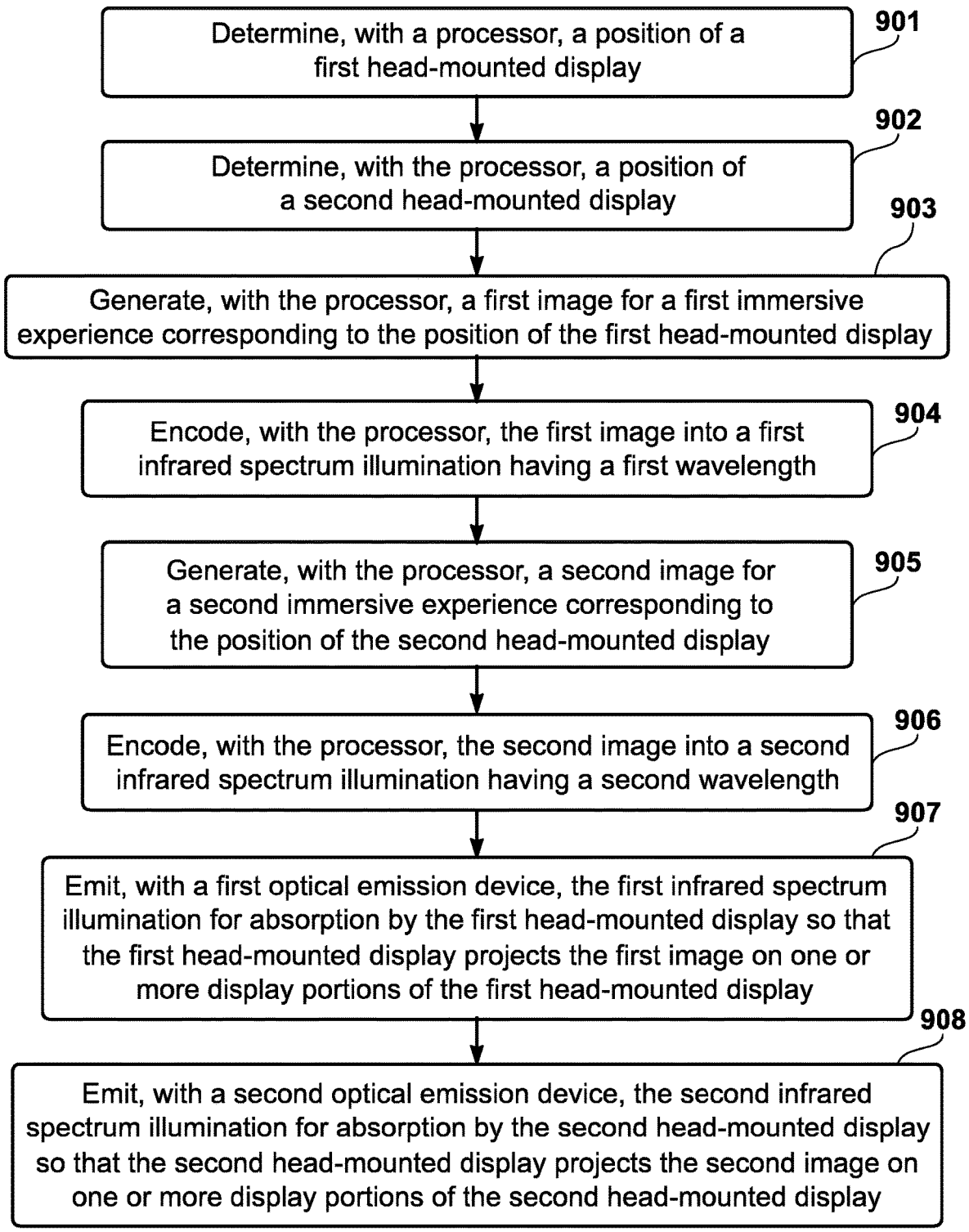
FIG. 9 illustrates a process that may be used by the illumination-based system, illustrated in FIG. 1, to deliver content to the users illustrated in FIG. 5.

FIG. 9 illustrates a process 900 that may be used by the illumination-based system 100, illustrated in FIG. 1, to deliver content to the users 501a-c illustrated in FIG. 5. At a process block 901, the process 900 determines, with the processor 201, a position of a first HMD 400a. Further, at a process block 902, the process 900 determines, with the processor 201, a position of a second HMD 400b. Additionally, at a process block 903, the process 900 generates, with the processor 201, a first image for a first immersive experience corresponding to the position of the first HMD 400a. At a process block 904, the process 900 encodes, with the processor 201, the first image into a first infrared spectrum illumination having a first wavelength. Moreover, at a process block 905, the process 900 generates, with the processor 201, a second image for a second immersive experience corresponding to the position of the second HMD 400b. At a process block 906, the process 900 encodes, with the processor 201, the second image into a second infrared spectrum illumination having a second wavelength. The first wavelength is distinct from the second wavelength. Further, at a process block 907, the process 900 emits, with the first optical emission device 103a, the first infrared spectrum illumination for reception (e.g., absorption) by the first HMD 400a so that the first HMD 400a projects the first image onto one or more display portions of the first HMD 400a. In addition, at a process block 908, the process 900 emits, with the second optical emission device 103b, the second infrared spectrum illumination for reception by the second HMD 400b so that the second HMD 400b projects the second image on one or more display portions of the second HMD 400b.

Figure 10:
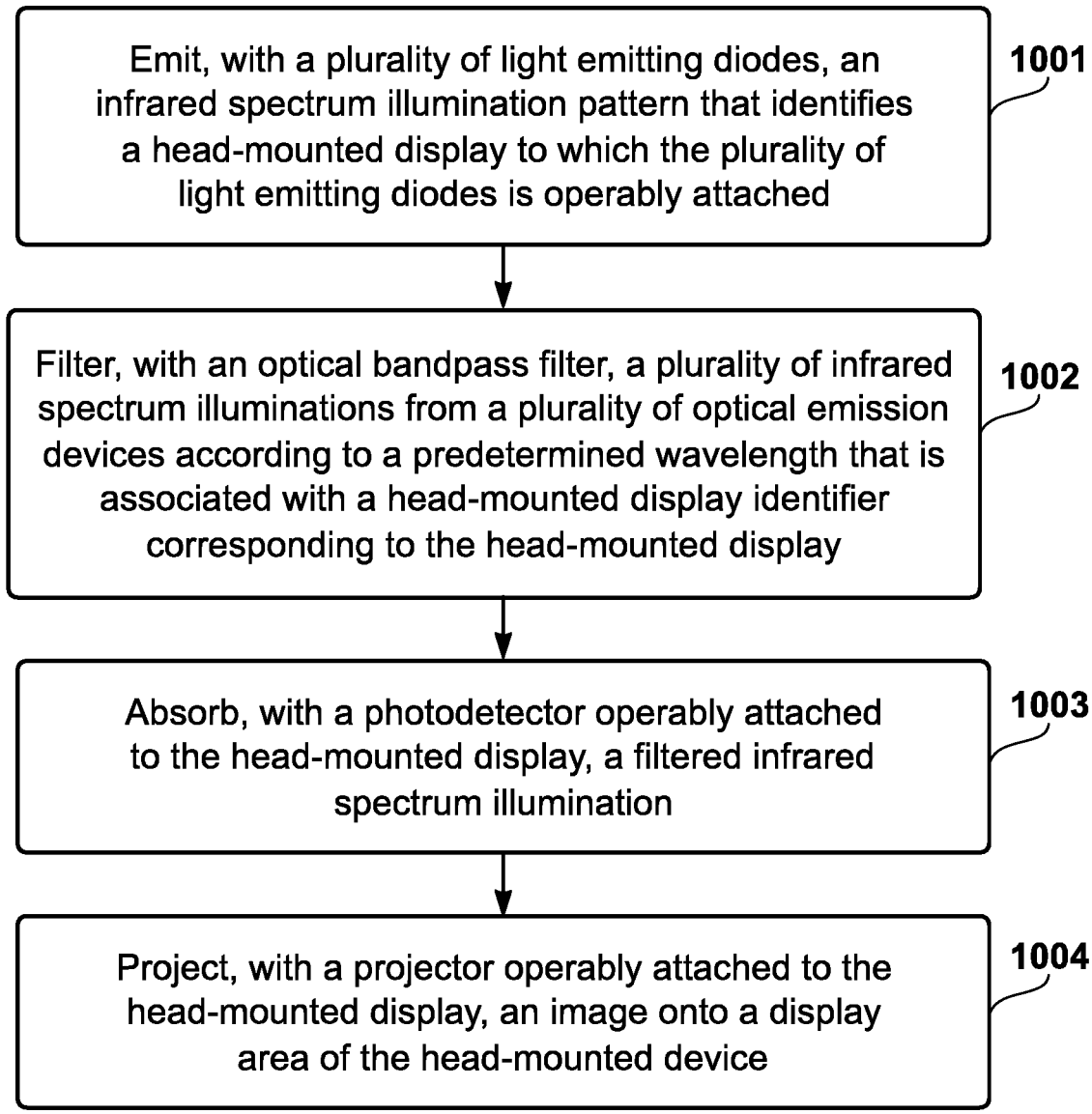
FIG. 10 illustrates a process that may be used by an HMD, illustrated in FIGS. 4A and 4B, to allow the HMD to be tracked by, and receive content from, the illumination-based system illustrated in FIG. 1.

Conversely, FIG. 10 illustrates a process 1000 that may be used by an AR-based HMD 400 or VR-based HMD 420, illustrated in FIGS. 4A and 4B, to allow the HMDs 400 and/or 420 to be tracked by, and receive content from, the illumination-based system 100, illustrated in FIG. 1. At a process block 1001, the process 1000 emits, with a plurality of light emitting diodes, an infrared spectrum illumination pattern that identifies the HMD 400 or 420 to which the plurality of LEDs 412 is operably attached. Further, at a process block 1002, the process 1000 filters, with an optical bandpass filter, a plurality of infrared spectrum illuminations from a plurality of optical emission devices 103a-d according to a predetermined wavelength that is associated with an HMD identifier corresponding to the HMD 400 or 420. Moreover, at a process block 1003, the process 1000 absorbs, with a photodetector 411 operably attached to the HMD 400 or 420, a filtered infrared spectrum illumination. Finally, at a process block 1004, the process 1000 projects, with a projector 406 or 407 operably attached to the HMD 400, an image onto a display area of the HMD 400 or 420. The image is stored in the filtered infrared spectrum illumination.

Figure 11:
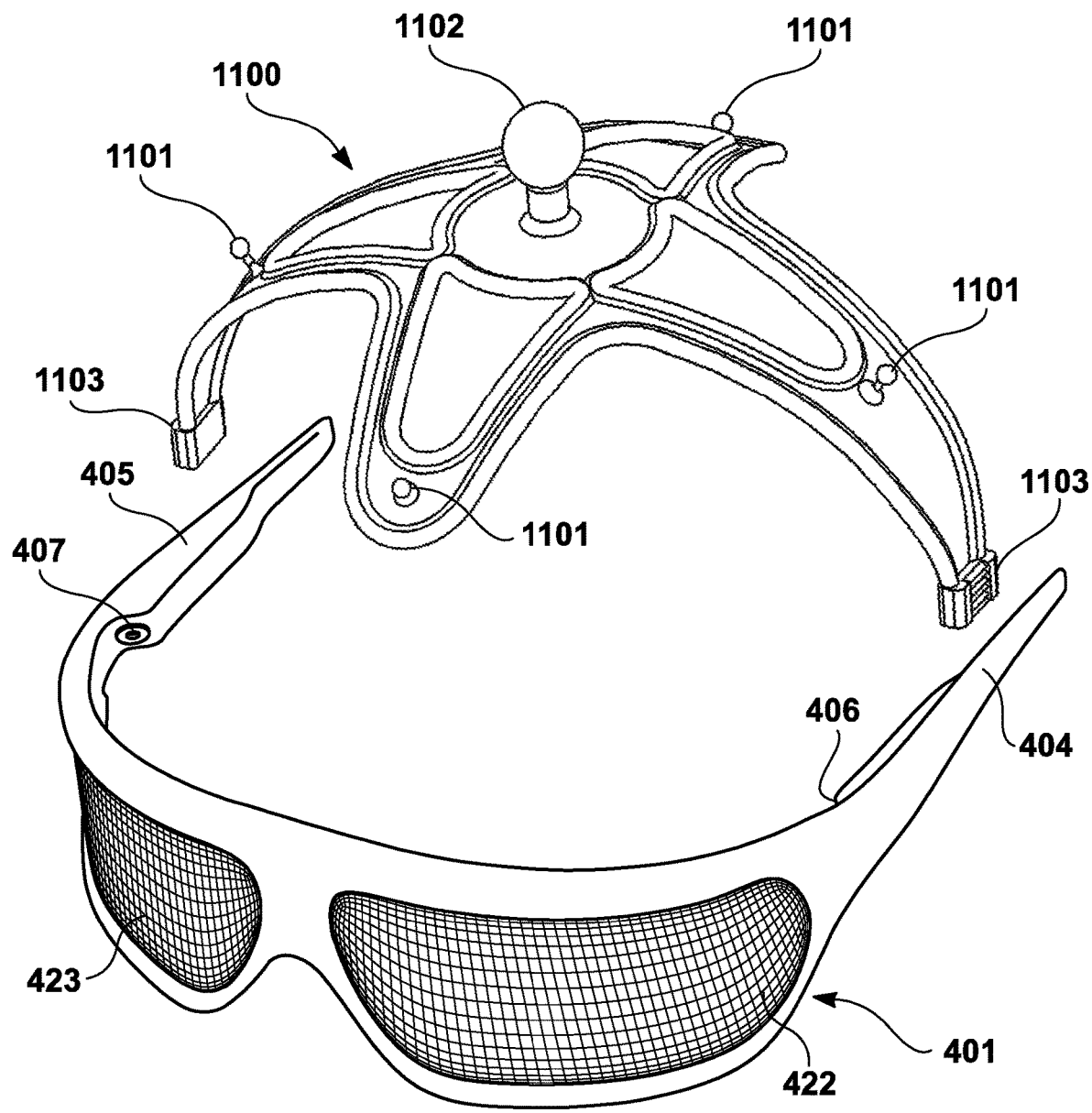
FIG. 11 illustrates an HMD accessory that may be adhered to the frame illustrated in FIG. 4B.

The processes 900 and 1000 illustrated in FIGS. 9 and 10 are not limited to the structural configurations of the AR-based HMD 400, illustrated in FIG. 4A, or the VR-based HMD 420, illustrated in FIG. 4B. For example, FIG. 11 illustrates an HMD accessory 1100 that may be adhered to the frame 401 illustrated in FIG. 4B. (Alternatively, the HMD accessory 1100 may be adhered to the frame 401 illustrated in FIG. 4A, or a different frame.) Instead of the LEDs 412 and the photodetector 411 being positioned on the frame 401 itself, the LEDs 412 and the photodetector 411 may be positioned on the HMD accessory 1100. For example, the LEDs 412 may be positioned within LED encasings 1101 along a periphery of a portion of the HMD accessory 1100, whereas the photodetector 412 may be positioned within a photodetector encasing 1102 positioned on the top of the HMD accessory 1100.

In essence, the HMD accessory 1100 allows for the LEDs 412 and the photodetector 411 to be elevated above the frame 401; such elevation may reduce the possibility of the LEDs 412 and the photodetector 411 being obscured (e.g., by hats, head movements, hand motions, etc.) during emission/reception.

Further, the HMD accessory 1100 may allow for integration of the processes and configurations provided for herein with a glasses frame that is not based on an HMD (i.e., a pair of glasses used by a user for other purposes). The HMD accessory 1100 may have one or more connectors 1103 (e.g., clips, magnets, bolts, screws, pins, etc.) that may connect the HMD accessory 1100 to the frame 401 (e.g., via the arms 404 and 405) in a manner that may be detachable. In one embodiment, the projectors 406 and 407 are on the frame 401. In another embodiment, the projectors 406 and 407 are operably attached to, or integrated within, the HMD accessory 1100.

Although the multi-user environment 300 is described herein with respect to one environment, multiple environments may be used instead. For example, the server 101 illustrated in FIG. 1 may be in operable communication with two remotely situated environments that allows for players of a multi-user AR game to visualize each other in their respective environments within the multi-user AR game.

Further, the configurations provided for herein may be implemented in single user environments in addition to multi-user environments. For example, a producer may enter a multi-user environment 300, illustrated in FIG. 3, to view an AR environment for a fully constructed production environment during pre-production to make adjustments to the production environment before actual construction of that environment.

The processes described herein may be implemented in a specialized processor. Such a processor will execute instructions, either at the assembly, compiled or machine-level, to perform the processes. Those instructions can be written by one of ordinary skill in the art following the description of the figures corresponding to the processes and stored or transmitted on a computer readable medium. The instructions may also be created using source code or any other known computer-aided design tool. A computer readable medium may be any medium, e.g., computer readable storage device, capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a specialized, general, multi-purpose, or single purpose processor as described above. For example, a computer may be a desktop computer, laptop, smartphone, tablet device, set top box, etc.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. An immersive experience system comprising:
   a processor communicatively coupled to a first optical emission device and a second optical emission device and located separately from a first head-mounted display and a second head-mounted display, the processor being configured to:
      determine a position of the first head-mounted display,
      determine a position of the second head-mounted display,
      generate a first image for a first immersive experience corresponding to the position of the first head-mounted display,
      encode the first image into a first infrared spectrum illumination having a first wavelength,
      generate a second image for a second immersive experience corresponding to the position of the second head-mounted display, and
      encode the second image into a second infrared spectrum illumination having a second wavelength, the first wavelength being different from the second wavelength;
   the first optical emission device, located separately from the first head-mounted display, configured to emit the first infrared spectrum illumination for reception by the first head-mounted display such that the first head-mounted display projects the first image onto one or more display portions of the first head-mounted display; and
   the second optical emission device, located separately from the second head-mounted display, configured to emit the second infrared spectrum illumination for reception by the second head-mounted display such that the second head-mounted display projects the second image onto one or more display portions of the second head-mounted display.

2. The immersive experience system of claim 1, further comprising a plurality of image capture devices configured to capture first positional imagery corresponding to the position of the first head-mounted display and second positional imagery corresponding to the position of the second head-mounted display.

3. The immersive experience system of claim 2, wherein the processor identifies the position of the first head-mounted device by performing a first image analysis on the first positional imagery to determine a first illumination pattern emitted by the first head-mounted device, the first illumination pattern identifying the first head-mounted display, and wherein the processor identifies the position of the second head-mounted device by performing a second image analysis on the second positional imagery to determine a second illumination pattern emitted by the second head-mounted device, the second illumination pattern identifying the second head-mounted display.

4. The immersive experience system of claim 1, further comprising an object at least partially surrounded by a diffusion material, the diffusion material configured to receive the first infrared spectrum illumination from the first optical emission device and the second infrared spectrum illumination from the second optical emission device, and diffuse the first infrared spectrum illumination and the second infrared spectrum illumination toward the first head-mounted display and the second head-mounted display, respectively.

5. The immersive experience system of claim 1, wherein the first immersive experience corresponds to a first viewpoint of content, wherein the second immersive experience corresponds to a second viewpoint of the content, the first viewpoint being different from the second viewpoint.

6. The immersive experience system of claim 1, wherein the first immersive experience corresponds to first content, wherein the second immersive experience corresponds to second content, the first content being different from the second content.

7. The immersive experience system of claim 1, wherein the first immersive experience is a first augmented reality experience, wherein the second immersive experience is a second augmented reality experience.

8. The immersive experience system of claim 1, wherein the first immersive experience is a first virtual reality experience, wherein the second immersive experience is a second virtual reality experience.

9. The immersive experience system of claim 1, wherein the first head-mounted display, the second head-mounted display, or combinations thereof each comprise:
  a frame;
  a display area operably attached to the frame;
  a photodetector operably attached to the frame;
  an optical bandpass filter that filters a plurality of infrared spectrum illuminations, including the first infrared spectrum illumination, the second infrared spectrum illumination, or combinations thereof, from a plurality of optical emission devices, including the first optical emission device, the second optical emission device, or combinations thereof, according to a predetermined wavelength such that a filtered infrared spectrum illumination is absorbed by the photodetector; and
  a projector operably attached to the frame, the projector projecting an image onto the display area, the image being stored in the filtered infrared spectrum illumination.

10. The immersive experience system of claim 1, wherein the first head-mounted display, the second head-mounted display, or combinations thereof each comprise a plurality of light emitting diodes, the plurality of light emitting diodes configured to emit an infrared spectrum illumination pattern identifying the first head-mounted display, the second head-mounted display, or combinations thereof, for transmission of the filtered infrared spectrum illumination by a plurality of optical emissions devices.

11. A method comprising:
  determining, with a processor communicatively coupled to a first optical emission device and a second optical emission device and located separately from a first head-mounted display and a second head-mounted display, a position of the first head-mounted display;
  determining, with the processor, a position of the second head-mounted display;
  generating, with the processor, a first image for a first immersive experience corresponding to the position of the first head-mounted display;
  encoding, with the processor, the first image into a first infrared spectrum illumination having a first wavelength;
  generating, with the processor, a second image for a second immersive experience corresponding to the position of the second head-mounted display;
  encoding, with the processor, the second image into a second infrared spectrum illumination having a second wavelength, the first wavelength being different from the second wavelength;
  emitting, with the first optical emission device located separately from the first head-mounted display, the first infrared spectrum illumination for reception by the first head-mounted display such that the first head-mounted display projects the first image onto one or more display portions of the first head-mounted display; and
  emitting, with the second optical emission device located separately from the second head-mounted display, the second infrared spectrum illumination for reception by the second head-mounted display such that the second head-mounted display projects the second image onto one or more display portions of the second head-mounted display.

12. The method of claim 11, further comprising capturing, with a plurality of image capture devices, first positional imagery corresponding to the position of the first head-mounted display and second positional imagery corresponding to the position of the second head-mounted display.

13. The method of claim 12, further comprising identifying the position of the first head-mounted device by performing a first image analysis on the first positional imagery to determine a first illumination pattern emitted by the first head-mounted device, the first illumination pattern identifying the first head-mounted display.

14. The method of claim 13, further comprising identifying the position of the second head-mounted device by performing a second image analysis on the second positional imagery to determine a second illumination pattern emitted by the second head-mounted device, the second illumination pattern identifying the second head-mounted display.

15. The method of claim 11, further comprising:
  receiving, at an object that is at least partially surrounded by a diffusion material, the first infrared spectrum illumination from the first optical emission device;
  receiving, at the object, the second infrared spectrum illumination from the second optical emission device; and
  diffusing, at the object, the first infrared spectrum illumination and the second infrared spectrum illumination toward the first head-mounted display and the second head-mounted display.

16. The method of claim 11, wherein the first immersive experience corresponds to a first viewpoint of content, wherein the second immersive experience corresponds to a second viewpoint of the content, the first viewpoint being different from the second viewpoint.

17. The method of claim 11, wherein the first immersive experience corresponds to first content, wherein the second immersive experience corresponds to second content, the first content being different from the second content.

18. The method of claim 11, wherein the first immersive experience is a first augmented reality experience, wherein the second immersive experience is a second augmented reality experience.

19. The method of claim 11, wherein the first immersive experience is a first virtual reality experience, wherein the second immersive experience is a second virtual reality experience.

* * * * *